United States Patent
Wang et al.

(10) Patent No.: US 10,778,360 B1
(45) Date of Patent: Sep. 15, 2020

(54) HIGH ACCURACY TIMESTAMP SUPPORT

(71) Applicant: Xilinx, Inc., San Jose, CA (US)

(72) Inventors: Lifeng Wang, Shanghai (CN); Jinhua Li, Shenzen (CN); Yong Hu, Shenzen (CN)

(73) Assignee: XILINX, INC., San Jose, CA (US)

( * ) Notice: Subject to any disclaimer, the term of this patent is extended or adjusted under 35 U.S.C. 154(b) by 103 days.

(21) Appl. No.: 16/212,391

(22) Filed: Dec. 6, 2018

(51) Int. Cl.
*H04J 3/06* (2006.01)
*H04L 7/033* (2006.01)
*H04L 7/00* (2006.01)

(52) U.S. Cl.
CPC .......... *H04J 3/0667* (2013.01); *H04J 3/0697* (2013.01); *H04L 7/0087* (2013.01); *H04L 7/0331* (2013.01)

(58) Field of Classification Search
None
See application file for complete search history.

(56) References Cited

U.S. PATENT DOCUMENTS

| | | | | |
|---|---|---|---|---|
| 4,021,742 | A * | 5/1977 | Machida | H03C 3/02 329/346 |
| 5,146,585 | A | 9/1992 | Smith, III | |
| 6,907,224 | B2 | 6/2005 | Younis | |
| 6,934,306 | B1 * | 8/2005 | Park | H04B 17/364 370/517 |
| 8,175,134 | B1 * | 5/2012 | Giallorenzi | H04B 1/692 375/132 |
| 10,498,475 | B1 * | 12/2019 | Devineni | H04J 3/0644 |
| 2004/0120407 | A1 * | 6/2004 | Searles | H04L 1/242 375/259 |

(Continued)

FOREIGN PATENT DOCUMENTS

| | | |
|---|---|---|
| CN | 102098155 A | 6/2011 |
| CN | 102833024 A | 12/2012 |
| WO | 2017063450 A1 | 4/2017 |

OTHER PUBLICATIONS

Eidson, John, "IEEE-1588 Standard for a Precision Clock Synchronization Protocol for Networked Measurement and Control Systems," Oct. 10, 2005, Tutorial on IEEE1588, Agilent Technologies, Santa Clara, California, USA.

(Continued)

*Primary Examiner* — Bunjob Jaroenchonwanit
(74) *Attorney, Agent, or Firm* — Craige Thompson, Thompson Patent Law

(57) ABSTRACT

Apparatus and associated methods relate to high accuracy timestamp support by controlling a first phase relationship between an outbound signal transmitted by a transmitting circuit and a local reference clock signal, measuring a second phase difference between a received data signal and the local reference signal, and measuring a third phase difference between a received time of day (RXTOD) signal and the local reference signal. In an illustrative example, a state machine circuit may be operated to control the first phase relationship, a phase measuring circuit may be configured to measure the second phase difference and the third phase difference. By comparing results obtained from phase control and phase measurement, the time of day (TOD) of each transmitted/received bit can be calculated at 1-bit level accuracy and achieve 1-bit level accuracy in the timestamp.

20 Claims, 6 Drawing Sheets

(56) References Cited

U.S. PATENT DOCUMENTS

| | | | | |
|---|---|---|---|---|
| 2009/0109954 A1* | 4/2009 | Laulainen | ................ | G04G 7/00 |
| | | | | 370/350 |
| 2011/0296226 A1* | 12/2011 | Sorbara | ............... | H04L 27/2673 |
| | | | | 713/400 |
| 2013/0077642 A1 | 3/2013 | Webb, III et al. | | |
| 2015/0016478 A1* | 1/2015 | Joergensen | ........... | H04J 3/0667 |
| | | | | 370/512 |

OTHER PUBLICATIONS

Rizzi, Mattia et. al, "White Rabbit clock characteristics," Proc. of the 2016 IEEE International Symposium on Precision Clock Synchronization for Measurement, Control, and Communication, Sep. 4, 2016, IEEE, Piscataway, New Jersey, USA.

Gaither, Justin, "Digital Phase-Locked Loop (DPLL) Reference Design," XAPP854 (v1.0), Oct. 10, 2006, pp. 1-11, Xilinx, Inc., San Jose, California, USA.

\* cited by examiner

HIGH ACCURACY TIMESTAMP SUPPORT

TECHNICAL FIELD

Various embodiments relate generally to achieve high accuracy timestamps for clock synchronization.

BACKGROUND

In communication applications, every device in a network may have its own internal clock running independently from other devices in the network. Without a unified and accurate time standard, devices in the network may be uncoordinated.

Network time protocol (NTP) is a networking protocol designed to synchronize clocks of computers to one or more time references. NTP is intended to synchronize participating computers to within a few milliseconds of coordinated universal time (UTC). NTP networks are software-based, and timestamp requests may have to wait for a local operating system.

Precision time protocol (PTP) is another network-based protocol that is used to synchronize clocks in a distributed system. PTP uses hardware timestamping instead of software timestamping. Every PTP sequence involves a series of four messages between master and slave, and four different timestamps are produced during this sequence.

SUMMARY

Apparatus and associated methods relate to high accuracy timestamp support by controlling a first phase relationship between an outbound signal transmitted by a transmitting circuit and a local reference clock signal, measuring a second phase difference between a received data signal and the local reference signal, and measuring a third phase difference between a received time of day (RXTOD) signal and the local reference signal. In an illustrative example, a state machine circuit may be operated to control the first phase relationship. A phase measuring circuit may be configured to measure the second phase difference and the third phase difference. By comparing results obtained from phase control and phase measurement, the time of day (TOD) of each transmitted/received bit can be calculated at 1-bit level accuracy and achieve 1-bit level accuracy in the timestamp.

Various embodiments may achieve one or more advantages. For example, some embodiments may employ an oversampling method to get specified accuracy. For example, some embodiments may generate a transmitted or received timestamp to an accuracy of about 100 ps level or better without using any external circuits. In some embodiments, the apparatus and associated method may be able to achieve about 40 ps level accuracy without using any special external circuits. For example, high accuracy timestamps may also be advantageous in 5G infrastructures. For example, high accuracy timestamps may also be advantageous in industrial control, locating applications, and position systems.

In one exemplary aspect, an integrated circuit includes a transmitting circuit configured to transmit an outbound signal to an external interface, a receiving circuit configured to receive a return signal from the external interface, and a clock generation circuit configured to generate a local reference clock signal to both the transmitting circuit and the receiving circuit. A state machine circuit is coupled to the transmitting circuit to control a phase relationship between the outbound signal and the local reference clock signal. A phase measuring circuit is coupled to the receiving circuit to measure a phase difference between the return signal and the local reference clock signal. The outbound signal includes a transmitted data signal, and the return signal includes a received data signal and a received time of day RXTOD signal.

In some embodiments, the state machine circuit may be configured to align the phase of the transmitted data signal with the local reference clock signal. In some embodiments, the outbound signal may also include a transmitted time of day TXTOD signal, and the state machine circuit may be configured to control a first phase difference between the transmitted time of day TXTOD signal with the local reference clock signal.

In some embodiments, the phase measuring circuit may be configured to measure a second phase difference between the received data signal and the local reference clock signal. In some embodiments, the phase measuring circuit may be configured to measure a third phase difference between the received time of day RXTOD signal and the local reference clock signal. In some embodiments, the transmitting circuit may also include a buffer, the buffer status may be indicated by an indication bit to find the alignment point. In some embodiments, the transmitting circuit and the receiving circuit may be configured to operate in an oversampling mode. In some embodiment, the phase measuring circuit may include a mixed-mode clock manager MMCM and a phase measure block. The MMCM may be configured to receive the local reference clock signal, and the phase measure block may be configured to receive the received data signal and an output of the MMCM. In some embodiments, the phase measuring circuit may also include at least one slice of the phase measure block configured to receive at least one return signals.

In another exemplary aspect, a method to support an accurate timestamp in an electrically programmed fabric includes generating a local reference clock signal to a transmitting circuit and a receiving circuit in the fabric. The method also includes generating an internal outbound signal by the transmitting circuit and controlling a phase relationship between the internal outbound signal and the local reference clock signal. The phase controlled outbound signal is transmitted to an external interface. The receiving circuit receives a return signal from the external interface. The method also includes measuring a phase difference between the return signal and the local reference clock signal. The outbound signal includes a transmitted data signal, and the return signal includes a received data signal and a received time of day RXTOD signal.

In some embodiments, the phase controlled outbound signal may be phase aligned with the local reference clock signal. In some embodiments, the aligning may include presetting a transmitter buffer with a predetermined occupancy rate, moving the phase of the transmitted data signal until the buffer has an occupancy less than the predetermined occupancy rate, moving the phase of the transmitted data signal until the buffer has an occupancy just above the predetermined occupancy, and locking the phase of the transmitted data signal.

In some embodiments, the occupancy rate may be indicated by an indication bit. In some embodiments, the predetermined occupancy may be 50%. In some embodiments the phase measuring circuit may include a mixed-mode clock manager MMCM and a phase measure block. The MMCM may be configured to receive the local reference clock signal and generate an output signal. The phase measure block may be configured to detect a phase difference in response to the return signal and the output signal.

In some embodiments, the phase measuring circuit may include at least one slice of the phase measure block. Each slice of the phase measure block may be configured to measure a phase difference between at least one return signals with the local reference clock signal. In some embodiments, the outbound signal may also include a transmitted time of day TXTOD signal. In some embodiments, the transmitting circuit and the receiving circuit may be configured to operate in an oversampling mode.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

To aid understanding, this document is organized as follows. First, an exemplary programmable integrated circuit (IC) on which the disclosed hardware acceleration processing engine and processes may be implemented is briefly introduced with reference to FIG. 1. Second, with reference to FIGS. 2-4, the discussion turns to exemplary embodiments that illustrate integrated circuits and methods to achieve high accuracy timestamps. Then, with reference to FIGS. 5-6, a state machine circuit and a phase measurement circuit are presented to fulfill phase control and phase measurement.

Figure 1:
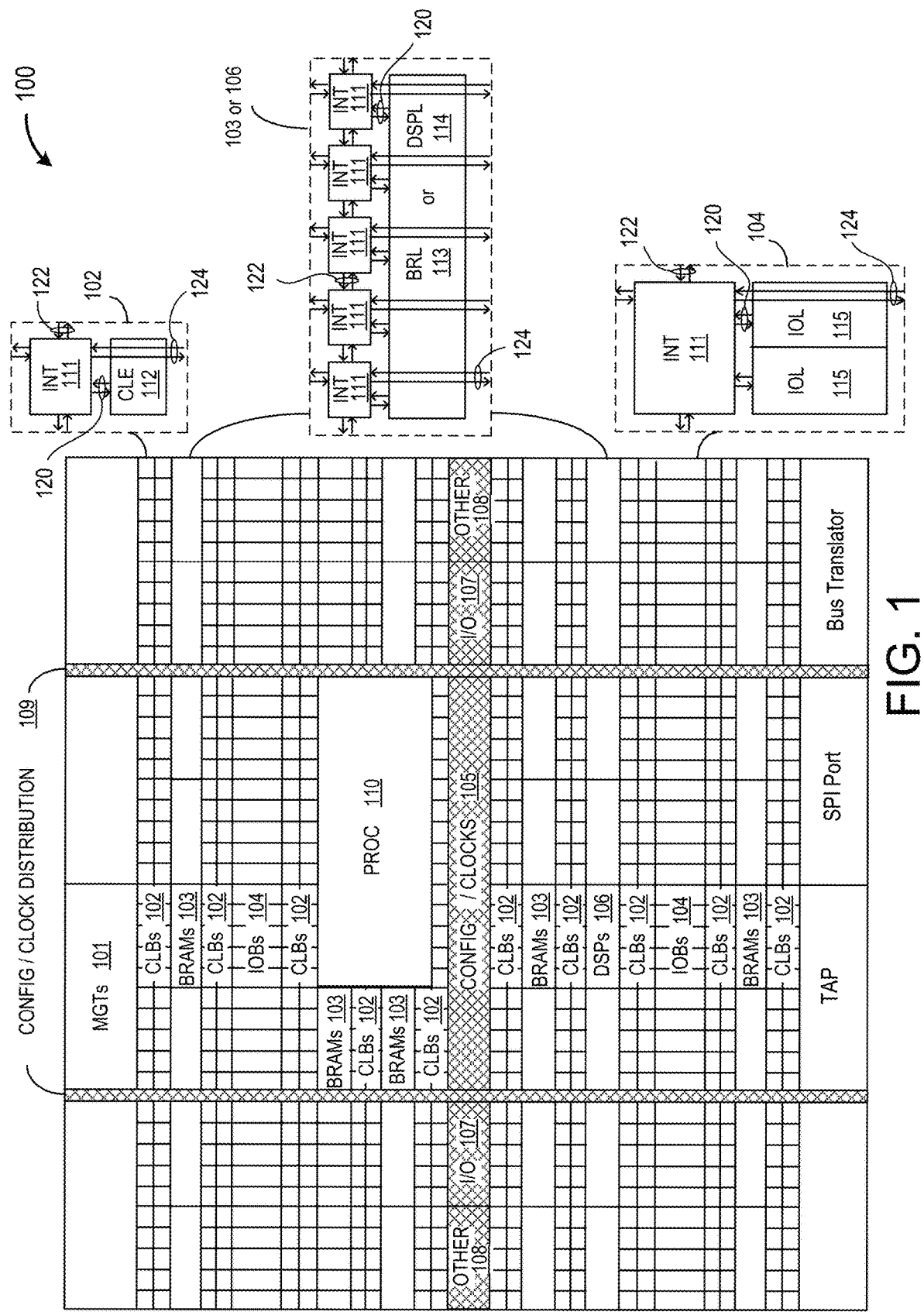
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An 10B 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

The FPGA may include transceivers used for data communication. IEEE Std. 1588 has provided a method to synchronize clocks of two nodes through a link and use time of day (TOD) timestamps when a message is being sent or received. With this method, the resulting synchronization accuracy is highly dependent on the accuracy of the timestamp. Other protocols may also depend on high accuracy timestamps. For example, high accuracy timestamps may also be advantageous in 5G infrastructures.

Figure 2:
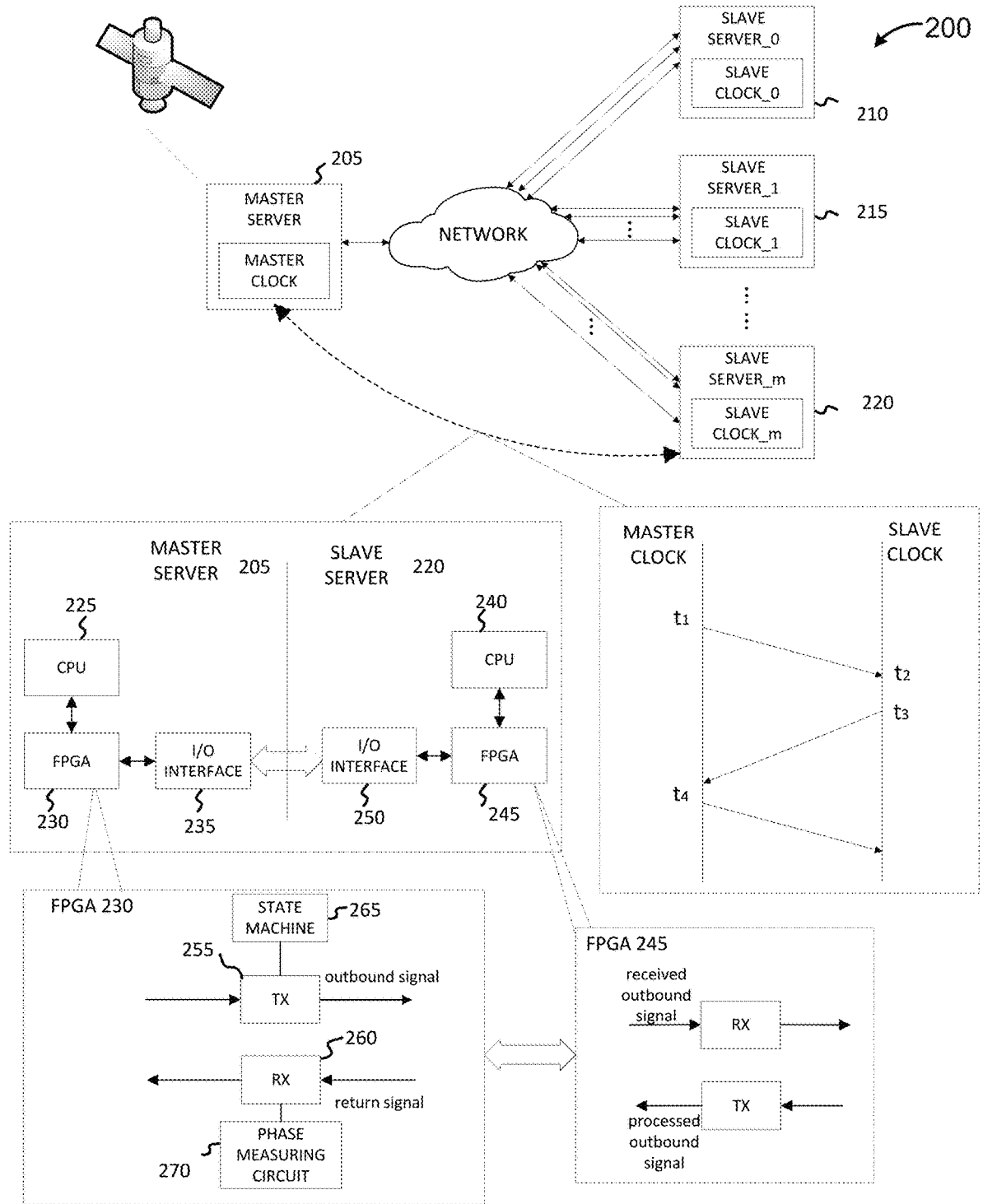
FIG. 2 depicts an apparatus implemented in an exemplary digital communication system to achieve high accuracy timestamps.

FIG. 2 depicts an apparatus implemented in an exemplary digital communication system to achieve high accuracy timestamps. In this illustrative example, a communication network 200 includes a master server 205. The master server 205 includes a master clock which establishes a time domain in the network 200. The communication network 200 also includes at least one slave server, for example, a slave server 210, a slave server 215 and a slave server 220. Each of these slave servers may operate on its own (e.g., uncoordinated or independent) time domain. Each slave server may have multiple links for communicating with the master server 205.

In this depicted example, the master server 205 includes a central processing unit (CPU) 225 configured to perform data processing. The master server 205 also includes a first FPGA 230 configured to transmit an outbound signal through a first I/O interface 235 to an external transceiver of a second FPGA 245 and receive a return signal through the first I/O interface 235 from the external transceiver of the second FPGA 245. Each slave server, for example, the slave server 220, also includes a CPU 240, a second FPGA (e.g., the second FPGA 245) and a second I/O interface 250. The second FPGA 245 is configured to receive a signal through the second I/O interface 250 from the first FPGA 230 and transmit a signal through the second I/O interface 250 to the first second FPGA 245. Different protocols may use different methods to synchronize time domain. Here, the IEEE 1588 protocol is discussed as an example. As disclosed in the IEEE 1588, four timestamps, $t_1$, $t_2$, is and $t_4$ are used to calculate a time difference between two different nodes. The time difference is calculated based on those four timestamps. Therefore, by providing high accuracy timestamps, the time difference may be calculated with high accuracy phase information such that different nodes may cooperate in a more synchronized relationship.

Unknown or uncoordinated phase relationships may affect transmitted accuracy because of unknown time of day (TOD) information for each bit in the transmitted data. A transmitter 255 may be configured to send outbound signal, and a receiver 260 may be configured to receive a return signal. Phase status of outbound signals may be controlled by operating a state machine circuit 265, and a phase measuring circuit 270 may be employed to measure phase status of received signals of a receiver 260. By accurately resolving all key phase relationships during data transfer, improved accuracy timestamp functionality may be achieved.

Figure 3:
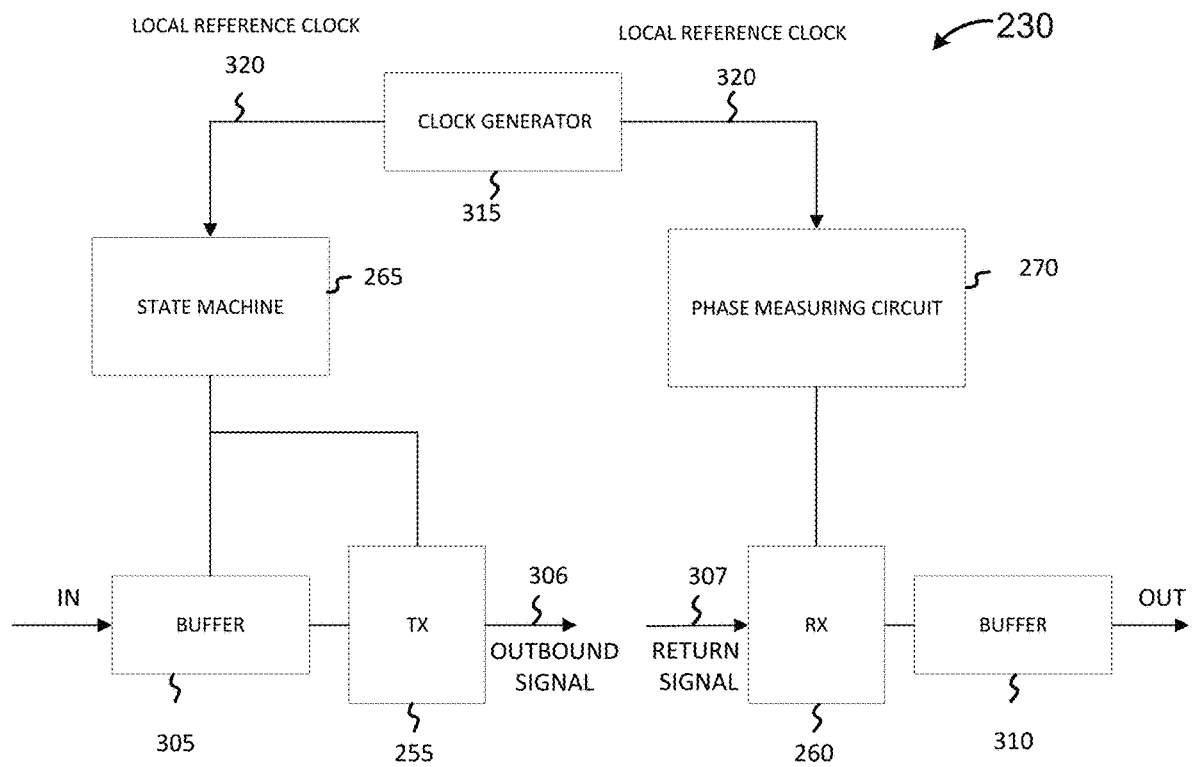
FIG. 3 depicts an apparatus to perform exemplary phase control and phase measurement to achieve the high accuracy timestamps in FIG. 2.

FIG. 3 depicts an apparatus to perform exemplary phase control and phase measurement to achieve the high accuracy timestamps in FIG. 2. In this depicted example, the FPGA 230 includes the transmitter 255. The transmitter 255 receives processed data from its buffer 305 and then transmits an outbound signal 306. The outbound signal 306 includes transmitted data. In some embodiments, the outbound signal 306 may also include a transmitted time of day (TXTOD) signal. In some embodiments, the buffer 305 may be a first-in first-out (FIFO) buffer. Both the buffer 305 and the transmitter 255 are monitored and controlled by a state machine, for example, the state machine circuit 265 in FIG. 2, to find a desired phase relationship. For example, a desired phase relationship may mean the two phases are aligned. In various embodiments, a desired phase relationship may mean there is a specified phase difference between the two phases. The specified phase difference may be used to achieve a specified accuracy. In some embodiments, the desired phase relationship may mean a consistent value that can be predicted (e.g., by a design simulation) or be repeatedly measured. For example, the desired phase difference may be a value that is kept with in an expected range upon circuit reset, power-cycling, or at a different physical instance of the same design.

The FPGA 230 also includes a clock generator 315. The clock generator 315 generates a local reference clock signal 320 feeding the state machine circuit 265. In some embodiments, the local reference clock signal 320 and the transmitted data may operate at a same frequency.

In operation, the state machine circuit 265 may align a phase of the transmitted data with the local reference clock signal 320. To achieve a fixed transmitter latency at sub-1 bit uncertainty upon system power up or reset, an indicator may be used to indicate a status of the buffer 305. In some embodiments, the indicator may be an indication bit (e.g., [bit]). In various embodiments, a predetermined threshold of the buffer 305 may define a phase alignment point. For example, when the buffer 305 is above the predetermined threshold, the indicator may show a first value, [bit]=1, for example. When the buffer 305 is below a predetermined threshold, the indicator may show a second value, [bit]=0, for example. In some embodiments, the predetermined threshold may be defined in association with the buffer 305 being half full. In some embodiments, the predetermined threshold may be defined in association with the buffer 305 being, for example, 30% full. By using a same predetermined threshold, consistency between different measurements may be achieved, and accurate calculations may be performed.

In some embodiments, the state machine circuit 265 may also be configured to control a first phase difference between the transmitted time of day (TXTOD) signal and the local reference clock signal 320 under an indicated status of the buffer 305 shown by the indicator. For example, an A bits phase difference between the transmitted time of day (TXTOD) signal and the local reference clock signal 320 may be obtained in response to the state machine circuit 265. By controlling phase of the transmitted data, an exact time in accuracy of 1 unit interval for each bit could be achieved.

The FPGA 230 also includes the receiver 260 receiving a return signal 307 from other nodes. In some embodiments, the return signal 307 may include a received data signal and a received time of day (RXTOD) signal. The receiver 260 connects with a second buffer 310. In some embodiments, the second buffer 310 may be configured to work in a bypass mode. Phase of the return signal 307 may be measured by the phase measuring circuit 270. In some embodiments, the phase measuring circuit 270 may measure a second phase difference between the received data signal and the local reference clock signal 320. In some embodiments, the phase measuring circuit 270 may measure a third phase difference between the received time of day (RXTOD) signal and the local reference clock signal 320. An example of a phase measuring circuit 270 is described in further detail with reference to FIG. 6. By obtaining all phase differences, a phase relationship between the transmitted data and the received data signal can be obtained.

Figure 4:
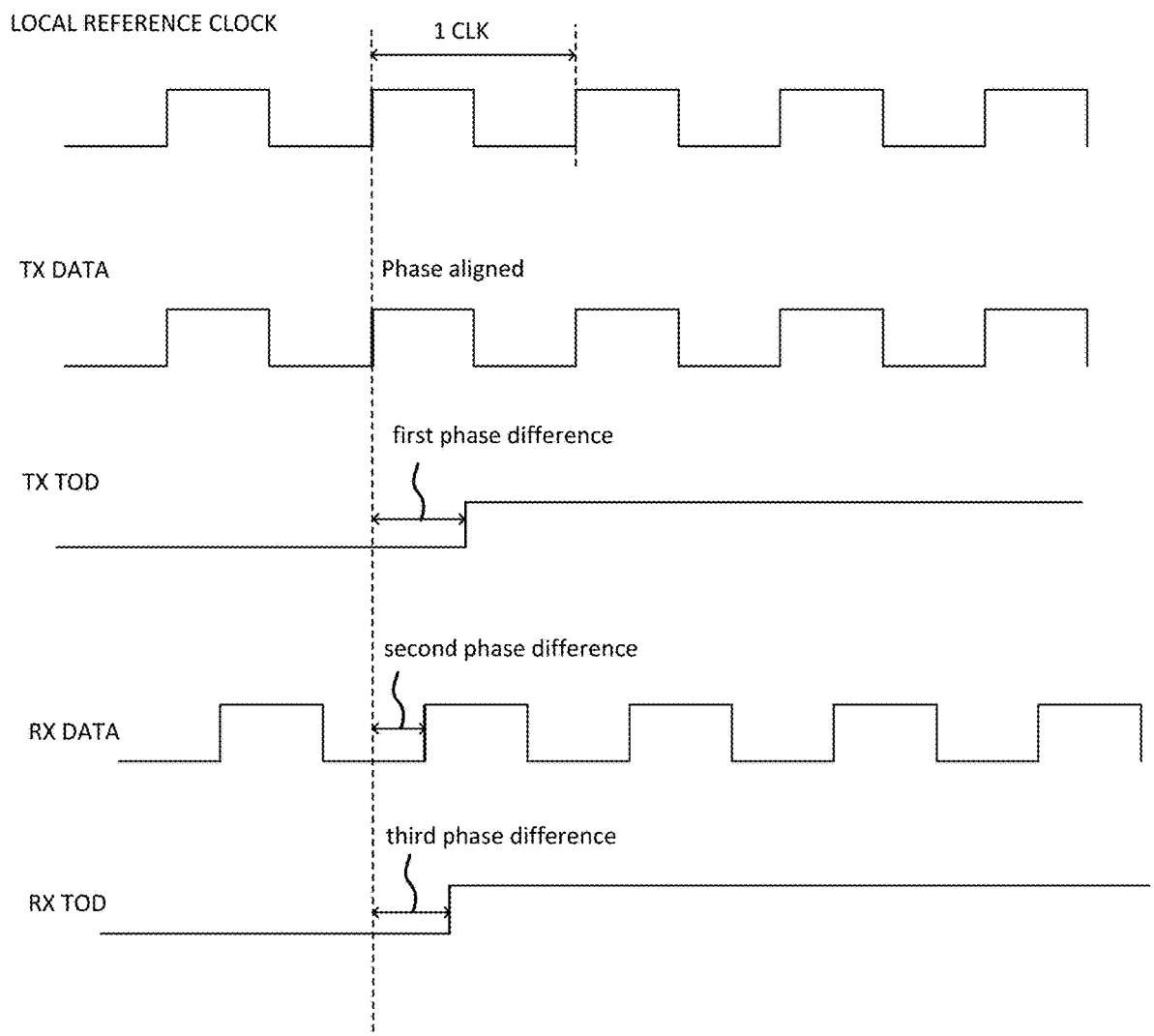
FIG. 4 depicts time diagrams showing an exemplary method to perform phase control and phase measurement.

FIG. 4 depicts time diagrams c an exemplary method to perform phase control and phase measurement. A method 400 includes providing a local reference clock signal (e.g., the local reference clock signal 320) as a common basis that can be used to control/measure phase information related to a transmitter (e.g., the transmitter 255) and a receiver (e.g., the receiver 260). In this depicted example, the local reference clock signal, the transmitter and the receiver may work in a common clock domain. The transmitter transmits an outbound signal (e.g., the outbound signal 306) to other nodes. In various embodiments, the outbound signal may include a transmitted data signal. In some embodiments, the outbound signal may include a transmitted time of day (TXTOD) signal. The receiver 260 receives a returning signal (e.g., the returning signal 307) from other nodes. The returning signal may include a received data signal and a received time of day (RXTOD) signal.

The method 400 also includes aligning phase of the transmitted data signal with phase of the local reference clock signal. Accurate transmitting time of each user bit may be calculated by the clock cycle that the bit transmitted plus the position of the bit in the transmitter interface bus. To achieve a fixed transmitter latency at sub-1 bit uncertainty, a state machine circuit is used upon system power up or reset. The alignment is controlled by the state machine circuit (e.g., the state machine circuit 265 in FIG. 3). An example to configure the state machine circuit is described in further detail with reference to FIG. 5.

In some embodiments, the method 400 may also include configuring the state machine circuit to control a first phase difference between the local reference clock signal and the transmitted time of day (TXTOD) signal. In this depicted example, the transmitter employs an oversampling mechanism and an A-bit phase difference may be obtained by controlling a transition from 0 to 1 of the transmitted time of day (TXTOD). In some implementations, for example, when oversampling rate of 10G/25G, a granularity of the transmitted time of day (TXTOD) signal rising edge position may achieve 100 ps/40 ps level. In some embodiments, a user logic circuit may be used to control the transition point between 0 and 1 for moving the phase of the transmitted time of day (TXTOD) signal to achieve a required accuracy.

The method 400 also includes measuring a second phase difference between the local reference clock signal (e.g., the local reference clock signal 320) with received data signal. Accurate receiving time of each user bit against edge of the received clock may be calculated by a clock cycle count plus position of the bit in the receiver interface bus. The second phase difference may be measured by a phase measuring circuit (e.g., the phase measuring circuit 270 in FIG. 3). An example of a phase measuring circuit is described in further detail with reference to FIG. 6. In some embodiments, at least 11-30 ps level granularity may be achieved, for example.

The method 400 also includes measuring a third phase difference between the local reference clock signal (e.g., the local reference clock signal 320) and the received time of day (RXTOD) signal. In this depicted example, the receiver (e.g., the receiver 260 in FIG. 3) employs an oversampling mechanism and the third phase difference may be measured by the phase measuring circuit (e.g., the phase measuring circuit 270 in FIG. 3), an example of the phase measuring circuit is described in further detail with reference to FIG. 6. In some embodiments, a user logic circuit may be used to detect the transition point between 0 and 1 and this information may be used to calculate the received time of day (RXTOD) signal of each clock cycle and bit position.

By comparing results obtained from phase control or phase measurement, time of day (TOD) of each transmitted/received bit can be calculated at 1-bit level accuracy and achieve 1-bit level accuracy in the timestamp. In some embodiments, this method may be applied to a 10G rate transceiver, and 1 bit may correspond to 100 ps, accordingly. In some implementations, this method may be applied to a 25G rate transceiver, accordingly, 1 bit may correspond to 40 ps.

Figure 5:
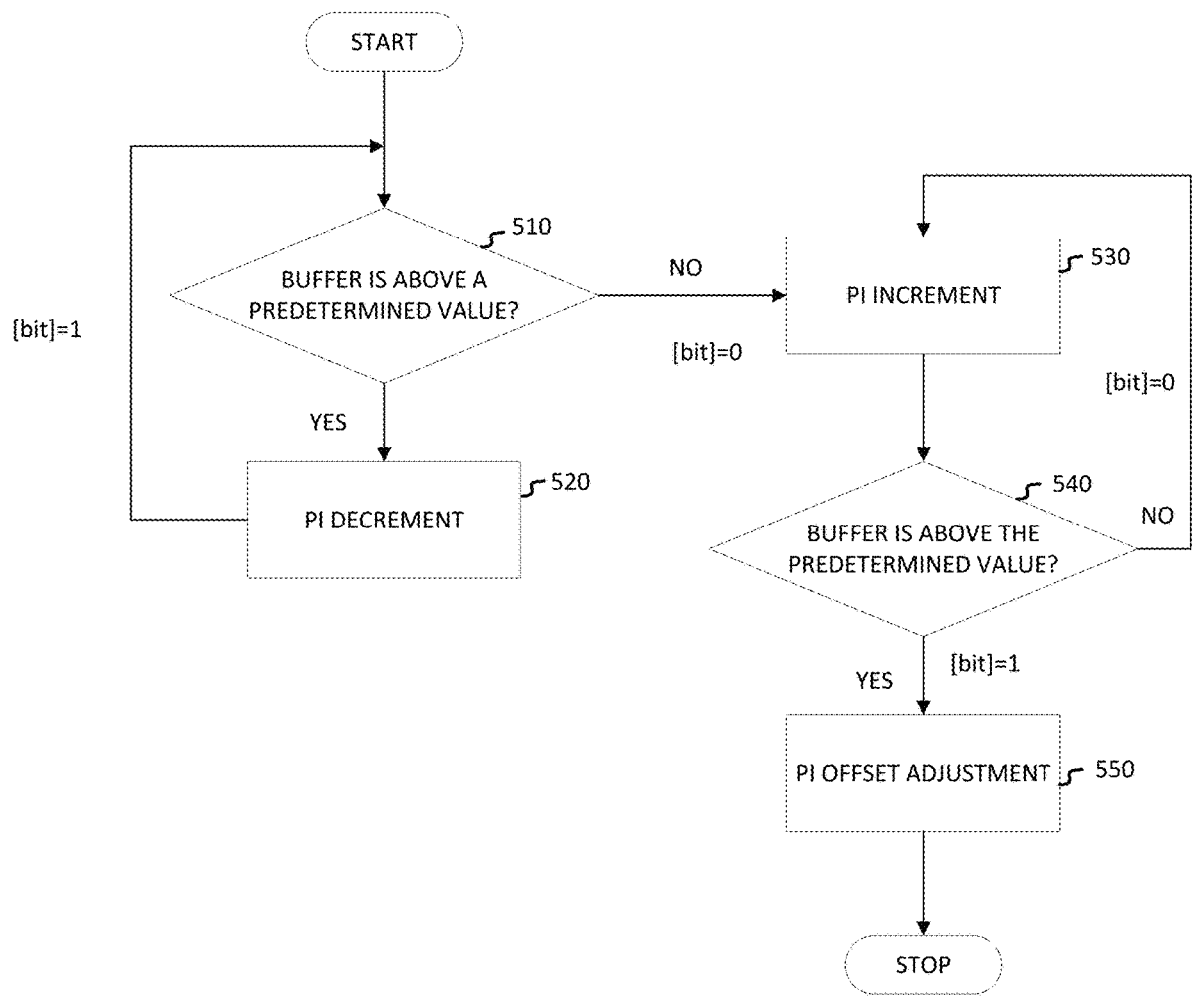
FIG. 5 depicts a flowchart related to an exemplary state machine circuit performing phase control.

FIG. 5 depicts a flowchart related to an exemplary state machine circuit performing phase control. Upon system power up or reset, the state machine circuit is configured to achieve a fixed transmitter latency at sub-1 bit uncertainty.

With reference to FIG. 3, both the buffer 305 and the transmitter 255 are monitored and controlled by the state machine circuit 265 to find a desired phase relationship. The state machine circuit 265 may be configured to align the phase between the transmitted data signal and the local reference clock signal 320. In some embodiments, the state machine circuit 265 may also be configured to control the phase difference between the transmitted time of day (TXTOD) signal and the local reference clock signal 320 to a desired value, for example, an A-bit phase difference.

To achieve fixed transmitter latency at sub-1 bit uncertainty, in this depicted example, a predetermined value of the buffer 305 is preset, and an indicator is used to identify the status of the buffer 305 by comparing a current value to the predetermined value. In this depicted example, the indicator is a bit [bit]. When [bit]=1, the buffer is above the predetermined value, and when [bit]=0, the buffer is below the predetermined value. By using the same predetermined value, consistency between different calculations may be achieved.

The state machine circuit may be used to move the phase of the transmitted data signal left or right to find the predetermined phase alignment point. When this point is found, the phase relationship may be locked as a final alignment position (e.g., stored in a data store).

In step 510, the state machine circuit determines whether the buffer is above the predetermined value. If the indicator shows [bit]=1, the transmitted data signal is moved to left until the indicator shows [bit]=0, as step 520 illustrated.

In step 530, the transmitted data signal is moved to right until the indicator shows [bit]=1, as step 540 illustrated.

In step 550, a final phase is determined by the state machine. This final phase of the transmitted data signal is aligned with the phase of the local reference clock signal.

For example, the predetermined value may be 50% full. In response to a request for phase information, the 50% full level may be used as a reference. When the buffer 305 is 70% full, an indicator, [bit], for example, may show that the buffer is above 50% full. Then the state machine circuit moves the transmitted data signal to left until the buffer 305 is below 50% full, for example, 45% full. Then the state machine circuit 305 moves the transmitted data signal to right until the buffer is just above 50% full. When the buffer is just above 50% full, the phases between the transmitted data signal and the local reference clock signal may be deemed as substantially aligned.

In some embodiments, the state machine circuit may also be used to control a phase difference between the transmitted time of day (TXTOD) and the local reference clock signal. A first phase difference, A bits, for example, may be required to obtain a desired accuracy. Similar to the method discussed before, the predetermined value may also be used to define the phase relationship. For example, when both two conditions are met, e.g., the buffer is 50% full and the phase difference is A-bit, the phase relationship may be defined as a real A-bit phase difference.

Figure 6:
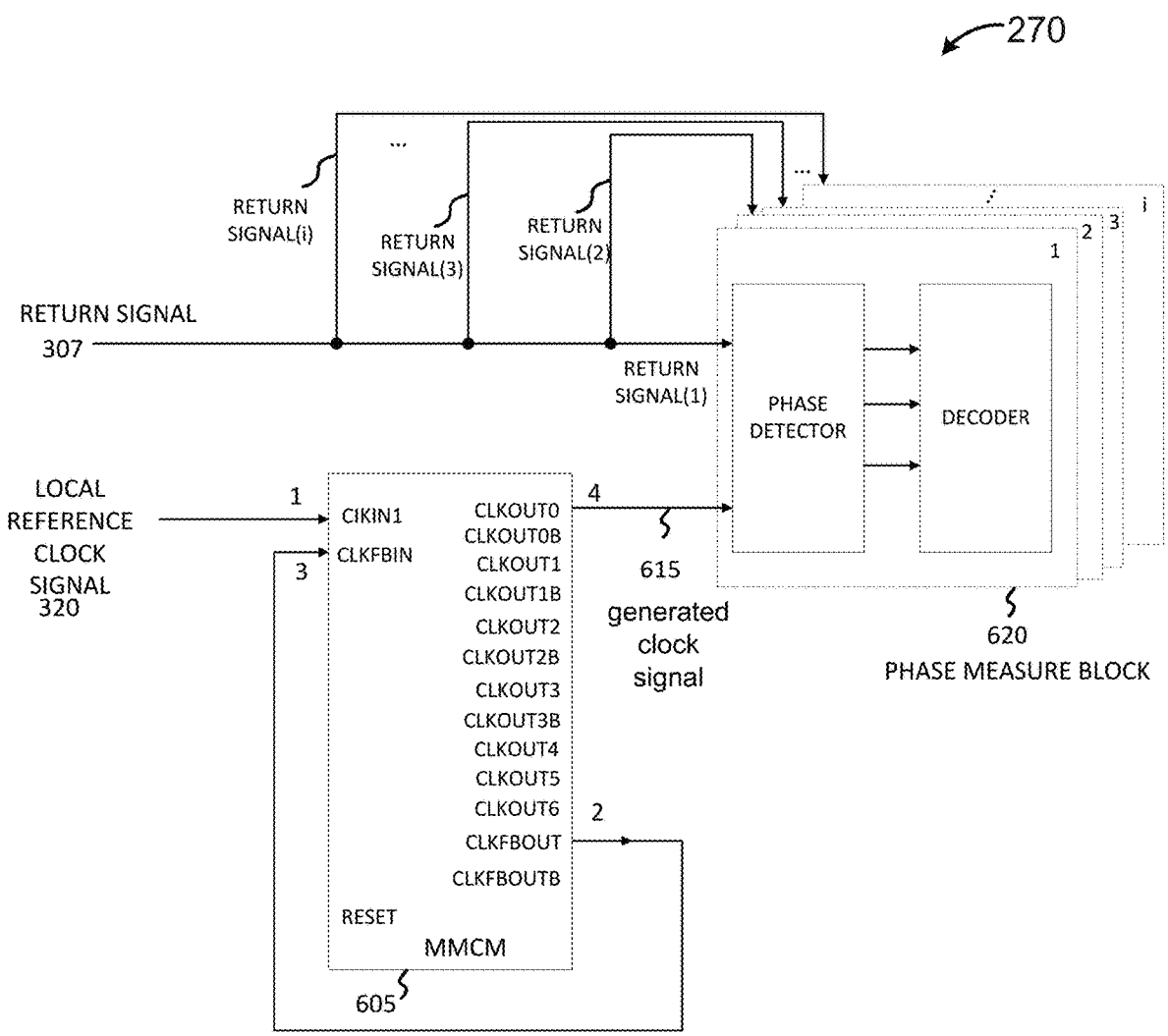
FIG. 6 depicts an exemplary phase measuring circuit used in FIG. 3.

FIG. 6 depicts an exemplary phase measuring circuit used in FIG. 3. In this depicted example, the phase measuring circuit 270 includes a mixed-mode clock manager (MMCM) 605. The MMCM 605 receives the local reference clock signal 320 as an input and generates multiple clocks with defined phase and frequency relationships to the local reference clock signal 320. In this depicted example, the MMCM 605 has reference points 1, 2, 3, 4, and the reference point 4 is moved dynamically to generate a clock signal 615 which has a specific phase and frequency relationship relative to the local reference clock signal 320 in reference point 1. Therefore, the exact phase adjustment between the generated clock signal 615 and the local reference clock signal 320 is obtained. A connection from the point 2 to point 3 may ensure that the reference point 4 and point 2 can be phase aligned with reference point 1 without being affected by MMCM internal processing delay variations. A phase difference between the generated clock signal 615 and a return signal 307 is detected by a phase measure block 620. The return signal 307 includes the received data signal and the received time of day (RXTOD) signal, When the generated clock signal 615 is shifted right or left, the phase measure block 620 sees a phase difference transition between the generated clock signal 615 and the return signal 307. In some embodiments, the phase measure block 620 may include a phase detector and a decoder configured to detect the phase difference between the generated clock signal 615 and the return signal 307. By knowing the phase difference between the return signal 307 and the generated clock signal 615 and the phase difference between the generated clock signal 615 and the local reference clock signal 320, a phase relationship between the return signal 307 and the local reference clock signal 320 is obtained.

In some embodiments, there may be multiple links between two nodes. For example, there may be 3 links between the master server 205 and the slave server 210 in FIG. 2. Therefore, multiple received clock signals RXOUTCLK(i) may be received and i different phase differences may need be measured. To reduce processing time, multiple slices of the phase measure block 620 may be configured to receive and detect those i different phase differences. For example, a first slice may be configured to detect a first phase difference in a first link, a second slice may be configured to detect a second phase difference in a second link. In this depicted example, the MMCM 605 is shared by those multiple slices of the phase measure block 620 to save hardware resources.

Although various embodiments have been described with reference to the figures, other embodiments are possible. For example, multiple MMCM may be configured to connect with multiple slices of phase measure block to achieve a faster processing time. In various embodiments, steps in the method may have different sequences. For example, the FPGA 245 in the slave server 220 may be configured with the state machine circuit and the phase measuring circuit. The slave server 220 may receive data and generate a received time of day (RXTOD) signal first and transmit data later. Accordingly, a phase difference between the received data signal and the local reference clock may be measured first.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:
1. An integrated circuit, comprising:
a transmitting circuit configured to transmit an outbound signal to an external interface;
a receiving circuit configured to receive a return signal from the external interface;
a clock generation circuit configured to generate a local reference clock signal to both the transmitting circuit and the receiving circuit;
a state machine circuit coupled to the transmitting circuit to control a phase relationship between the outbound signal and the local reference clock signal; and,
a phase measuring circuit coupled to the receiving circuit to measure a phase difference between the return signal and the local reference clock signal,
wherein the outbound signal comprises a transmitted data signal, and the return signal comprises a received data signal and a received time of day RXTOD signal.
2. The integrated circuit of claim 1, wherein the state machine circuit is configured to align the phase of the transmitted data signal with the local reference clock signal.
3. The integrated circuit of claim 1, wherein the outbound signal further comprises a transmitted time of day TXTOD signal, and the state machine circuit is configured to control a first phase difference between the transmitted time of day TXTOD signal with the local reference clock signal.
4. The integrated circuit of claim 1, wherein the phase measuring circuit is configured to measure a second phase difference between the received data signal and the local reference clock signal.
5. The integrated circuit of claim 1, wherein the phase measuring circuit is configured to measure a third phase difference between the received time of day RXTOD signal and the local reference clock signal.
6. The integrated circuit of claim 2, wherein the transmitting circuit further comprises a buffer, the buffer status is indicated by an indication bit to find the alignment point.
7. The integrated circuit of claim 1, wherein the transmitting circuit is configured to operate in an oversampling mode.

8. The integrated circuit of claim 1, wherein the receiving circuit is configured to operate in an oversampling mode.

9. The integrated circuit of claim 1, wherein the phase measuring circuit further comprises a mixed-mode clock manager MMCM and a phase measure block, wherein the MMCM is configured to receive the local reference clock signal, and the phase measure block is configured to receive the received data signal and an output of the MMCM.

10. The integrated circuit of claim 9, wherein phase measuring circuit further comprises a plurality of slices of the phase measure block configured to receive a plurality of return signals.

11. A method to support an accurate timestamp, comprising:
 generating, with a clock generation circuit, a local reference clock signal to a transmitting circuit and a receiving circuit;
 transmitting, with the transmitting circuit, an outbound signal to an external interface;
 controlling, with a state machine circuit coupled to the transmitting circuit, a phase relationship between the outbound signal and the local reference clock signal;
 receiving, with the receiving circuit, a return signal from the external interface; and,
 measuring, with a phase measuring circuit coupled to the receiving circuit, a phase difference between the return signal and the local reference clock signal,
 wherein the outbound signal comprises a transmitted data signal, and the return signal comprises a received data signal and a received time of day RXTOD signal.

12. The method of claim 11, wherein the controlling further comprises aligning the transmitted data signal with the local reference clock signal.

13. The method of claim 12, wherein the aligning further comprises:
 presetting a transmitter buffer with a predetermined occupancy rate;
 moving the phase of the transmitted data signal until the buffer has an occupancy less than the predetermined occupancy rate;
 moving the phase of the transmitted data signal until the buffer has an occupancy just above the predetermined occupancy; and,
 locking the phase of the transmitted data signal.

14. The method of claim 13, wherein the occupancy rate is indicated by an indication bit.

15. The method of claim 13, wherein the predetermined occupancy is 50%.

16. The method of claim 11, wherein the phase measuring circuit further comprises a mixed-mode clock manager MMCM and a phase measure block.

17. The method of claim 16, further comprising: receiving, with the MMCM, the local reference clock signal and generating an output signal; and, detecting, with the phase measure block, a phase difference in response to the return signal and the output signal.

18. The method of claim 16, wherein the phase measuring circuit further comprises a plurality of slices of the phase measure blocks configured to measure phase differences between a plurality of return signals with the local reference clock signal.

19. The method of claim 11, wherein the outbound signal further comprises a transmitted time of day TXTOD signal.

20. The method of claim 11, further comprising configuring the transmitting circuit and the receiving circuit to operate in an oversampling mode.

* * * * *